(12) United States Patent
Bhandari et al.

(10) Patent No.: US 11,383,596 B2
(45) Date of Patent: Jul. 12, 2022

(54) LEAK PROOF SOLENOID VALVE WITH COMPLETELY COVERED BOBBIN FOR CONTROLLING FUEL EMISSION

(71) Applicant: PADMINI VNA MECHATRONICS PVT. LTD., Gurgaon (IN)

(72) Inventors: Kabir Bhandari, New Delhi (IN); Torsten Gerlich, Bensheim (DE); Amardip Kumar, Gurgaon (IN); Nitin Manhas, Gurgaon (IN); Ghanshyam Swarnkar, Gurgaon (IN); Deepak Nirankari, Gurgaon (IN)

(73) Assignee: PADMINI VNA MECHATRONICS PVT. LTD., Haryana (IN)

( * ) Notice: Subject to any disclaimer, the term of this patent is extended or adjusted under 35 U.S.C. 154(b) by 95 days.

(21) Appl. No.: 15/734,414

(22) PCT Filed: Jul. 7, 2018

(86) PCT No.: PCT/IB2018/055023
§ 371 (c)(1),
(2) Date: Dec. 2, 2020

(87) PCT Pub. No.: WO2019/138270
PCT Pub. Date: Jul. 18, 2019

(65) Prior Publication Data
US 2021/0188080 A1    Jun. 24, 2021

(30) Foreign Application Priority Data

Jan. 15, 2018  (IN) ............................ 201811001577

(51) Int. Cl.
*B60K 15/00*    (2006.01)
*B60K 15/035*   (2006.01)
(Continued)

(52) U.S. Cl.
CPC ...... *B60K 15/03519* (2013.01); *F16K 27/029* (2013.01); *F16K 31/0655* (2013.01); *F16K 51/00* (2013.01); *B60K 2015/03302* (2013.01)

(58) Field of Classification Search
CPC .... B60K 15/03519; B60K 2015/03302; F16K 27/029; F16K 31/0655; F16K 51/00; F02M 2025/0845; F02M 25/0836
See application file for complete search history.

(56) References Cited

U.S. PATENT DOCUMENTS

| 3,896,405 A * | 7/1975 | Pauli ................... F16K 31/0675 |
| | | 335/255 |
| 4,109,221 A * | 8/1978 | Pauli ..................... H01F 7/1607 |
| | | 335/251 |

(Continued)

*Primary Examiner* — Sizo B Vilakazi
*Assistant Examiner* — Sherman D Manley
(74) *Attorney, Agent, or Firm* — Sinorica LLC

(57) ABSTRACT

A leak proof, completely sealed solenoid valve, comprising a housing 14 having a fluid flow path controlled via an electrically operated mechanism to control a flow; the mechanism comprises metallic coil 20 coiled around a bobbin 16 supported by a magnetic bracket 24 with terminal pins 18 connected to the bobbin 16 for receiving electrical input to facilitate an energized and de-energized state to control the movement of a poppet 34 shaft that obstructs the flow; wherein, the bobbin 16 comprises micro-melting fins, thereby housing over molding creates strong bond between two materials; a permanent weld is created between the bobbin 16 and the housing 14 to prevent internal leakage; and the completely sealed solenoid valve limits emissions and evaporations of the volatile fuel components into and from the valve, and contribute to reliability and robustness of the product by completely sealing the nozzle and housing using laser welding.

7 Claims, 5 Drawing Sheets

(51) Int. Cl.
*F16K 27/02* (2006.01)
*F16K 31/06* (2006.01)
*F16K 51/00* (2006.01)
B60K 15/03 (2006.01)

(56) References Cited

U.S. PATENT DOCUMENTS

| | | | |
|---|---|---|---|
| 9,683,665 B2* | 6/2017 | Harada | F16K 1/52 |
| 2002/0189589 A1 | 12/2002 | Kato et al. | |
| 2005/0217734 A1* | 10/2005 | Takakura | F16K 31/0655 |
| | | | 137/587 |
| 2008/0116409 A1* | 5/2008 | Vaz De Azevedo | |
| | | | F16K 31/0655 |
| | | | 251/282 |
| 2008/0149868 A1* | 6/2008 | Bittner | F16K 31/0655 |
| | | | 251/24 |
| 2013/0093413 A1* | 4/2013 | Itonaga | G01B 7/14 |
| | | | 324/207.15 |
| 2013/0112290 A1* | 5/2013 | Gerlich | F16K 24/04 |
| | | | 137/487.5 |
| 2013/0134339 A1* | 5/2013 | Miura | F16K 31/0693 |
| | | | 251/337 |
| 2014/0239210 A1* | 8/2014 | Alvarez | F16K 31/0675 |
| | | | 251/129.15 |
| 2020/0271062 A1* | 8/2020 | Bhandari | F16K 31/0655 |

* cited by examiner

LEAK PROOF SOLENOID VALVE WITH COMPLETELY COVERED BOBBIN FOR CONTROLLING FUEL EMISSION

FIELD OF THE INVENTION

The present invention provides leak proof solenoid valve with completely sealed bobbin. More specifically, the invention provides a solenoid valve having a sealed bobbin to prevent internal leakage between the coil and the over molding housing by creating a permanent weld at the top of bobbin and over molding housing; and at the bottom to bobbin and the over molding housing, hereby eliminating all potential leakage paths.

BACKGROUND OF THE INVENTION

One of the major source of automotive hydrocarbon emission is the fuel system, from which hydrocarbons are emitted through fuel tank and carburetor vents. When the engine is turned off and the engine heat warms up the fuel system, gasoline is evaporated and emitted to the atmosphere. In addition, heating during the day or cooling at night causes the fuel tank to breathe and emit gasoline fumes. The efforts to control such emissions are majorly focused towards reducing volatility by modifying formulation. Further, the automobiles are equipped with canisters of carbon, which collect the evaporated fuel from the fuel tank and fuel system, to be purged and burned when the engine is operating.

A typical EVAP system affect the operation of the Evaporative Emission, the EVAP system comprises a Fuel Tank, a Fuel Fill Cap, an EVAP Two Way Valve, an EVAP Control Canister, an EVAP Three Way Valve, a Fuel Tank Pressure Sensor, a Powertrain (PCM) Control Module, a EVAP Purge Control Solenoid Valve and an EVAP Control Canister Vent Shut Valve.

EVAP Purge Control Solenoid valves are electromagnetically operated valve, which opens or closes when the current is applied and the fluid passed. The electromechanical solenoids comprises an electromagnetically inductive coil, wound around a movable steel or iron slug or armature. The coil is shaped such that the armature can be moved in and out of the center, altering the coil's inductance and thereby becoming an electromagnet. The armature is used to provide controlled mechanical force to certain mechanism (such as controlling mechanism for a pneumatic valve). Although, such solenoids are typically employed to control various mechanisms but are preferably installed to control flow over very short distances, and thus have very quick reaction times, which are operated directly via a controller circuit.

It is known in the art of automotive fuel systems to use an evaporative (EVAP) solenoid valve assembly to control the flow of fuel vapor through passageways connecting a purge canister and an intake manifold. One such EVAP control valve assembly includes a solenoid assembly actuated in response to a pulse width modulated (PWM) signal generated by the vehicle's central computer to induce a plunger to move forward or backward, thus making a passageway to the flow of vapor. When the solenoid is de-energized, the plunger and sealing is pushed away from the opening of nozzle and allows the fluid entry into the valve. When the solenoid is energized, the plunger and sealing close the opening of nozzle and restricts the fluid entry into the valve.

The conventional solenoid valves provide bobbin attachment by snap fitting, to seal the solenoid. As these fittings are snap fittings, due to prolonged usage, continuous engine vibration or shake, these fittings tend to become lose. These lose fittings leads to a faulty EVAP system, which allows fuel vapors in the fuel tank from escaping into the atmosphere or to the electrical system. Further, such leakage also decreases the performance of the valve. In addition, since the bobbin is snap fitted in the housing, the chances of misalignment between the two parts will occur which leads to the faulty operation.

Therefore, we can deduce from the current state of art that after persistent and prolonged usage, the seals function improperly, as these are snap fitted and further the complete sealing of the copper wire of the solenoid is not achieved due to the incomplete material bond. The present invention overcomes all the deficiency of the prior art.

OBJECT OF THE INVENTION

The main object of the invention is to provide a leak proof solenoid with completely sealed bobbin.

Yet another object of the invention is to provide a solenoid valve having a sealed bobbin to prevent internal leakage between the coil and the over molding housing by creating a permanent weld at the top of bobbin and over molding housing, preferably but not limited to method such as Micro-Melting.

Yet another object of the invention is to provide a solenoid valve having a sealed bobbin to prevent internal leakage between the coil and the over molding housing by creating a permanent weld at the top of bobbin and over molding housing and at the bottom to bobbin and the over molding housing, hereby eliminating all potential leakage paths, preferably but not limited to method such as Micro-Melting.

Yet another object of the invention is to provide a leak proof solenoid with completely covered bobbin to prevent internal and external leakage between the coil and the over molding concealing the connector pins.

Yet another object of the invention is to provide a leak proof solenoid with completely covered bobbin to prevent internal leakage between the coil and over molding concealing the connector pins, having complete material bond, preferably useful to limit emissions and evaporations.

Yet another object of the invention is to provide a leak proof solenoid with completely laser welded nozzle and housing, preferably useful to limit emissions and evaporations.

Yet another object of the invention is to completely seal the solenoid for enhancing the longevity and the performance.

SUMMARY OF THE INVENTION

The present invention provides a leak proof solenoid valve with completely sealed bobbin. More specifically, the invention provides a solenoid valve having a sealed bobbin to prevent internal leakage between the coil and the over molding housing by creating a permanent weld at the top of bobbin and over molding housing; and between a closed bottom to the over molding housing, thereby eliminating all potential leakage paths over prolonged usage. Further, such valves have specific application in controlling the emission.

In an embodiment of the present invention, the solenoid valve provided comprises a nozzle, a housing, a bobbin, terminals, coil, a fix core plate, a magnetic bracket, o-ring, a noise damper spring, a moving core, a fix core, a poppet, a sealing rubber and a spring.

In another embodiment of the present invention, a molded nozzle is provided for connecting the inlet hose. Nozzle is made up of material such as, but not limited to like thermoplastics, PVC, PUC, etc. Further, an over molded housing is provided for enclosing the coil assembly and have an outlet nozzle to connect hose. Housing is made up of material such as, but not limited to thermoplastics, PVC, PUC, etc.

In another embodiment of the present invention, the bobbin for a solenoid valve coil is provided that includes a bobbin formed from an electrically insulated material such as, thermoplastics, with a bore extending axially and closed at the bottom. Further, a metallic coil or a coil made up of conducting material such as copper is then wound or wrapped around the bobbin, which when energized sets up a magnetic field. At the opening face of bobbin, a fix core plate is attached and coil with bobbin is put inside a magnetic bracket which is crimped to fix core plate to form a coil assembly, where the fix core shall be placed to complete the magnetic circuit. Further, at the one end, terminal pins are connected with in bobbin to which coil's end are connected for receiving electrical input.

In another embodiment of the present invention, the bobbin with micro-melting fins are provided, so that during housing over molding strong bond between two materials can be formed, the provided fix core plate is arranged at the opening end of bobbin to provide a magnetic path to attract the poppet upward against the spring force of the spring, an o-ring is provided to prevent internal leakage of volatile fuel into coil and serve as an additional EVAP leak proofing, a moving core is provided which operates when the coil is energized. The moving core is attracted to a fixed core and drives the poppet in one direction. When the coil is de-energized, the moving core is separated from the fixed core by a return spring to return the valve member in the opposite direction. In another embodiment of the present invention, the provided fix core is assembled in to the inner diameter of bobbin and gets magnetized when coil is energized, the noise damper spring is provided to dampen noise during valve in operation, a poppet is provided which selectively opens and closes the supply of air into the valve upon energization and de-energization, a sealing rubber is provided which under energized condition, blocks the air flow, a spring is provided to reset the poppet position on de-energization, a housing sub-assembly is provided formed by over molding coil assembly inside housing body.

In another embodiment of the present invention, the invention is preferably useful to limit emissions and evaporations of the volatile fuel components into and from the valve, and contribute to reliability and robustness of the product by completely sealing the nozzle and housing using laser welding. The invention replaces the conventional bobbin attachment by snap fitting to seal solenoid. More specifically, the present invention welds or provides complete material bond of the bobbin at the top and at the bottom of the solenoid.

BRIEF DESCRIPTION OF THE DRAWINGS

The object of the invention may be understood in more details and more particularly description of the invention briefly summarized above by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DETAILED DESCRIPTION OF INVENTION

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Figure 1:
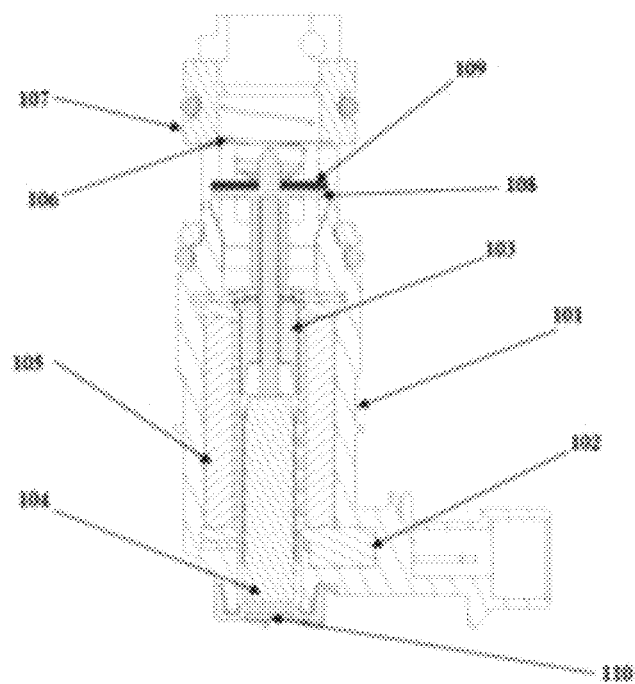
FIG. 1 shows the conventional solenoid valve with coil stopper at the bottom.

FIG. 1 shows a conventional solenoid valve wherein arrangements of different parts are highlighted, the conventional solenoid valve comprising of a housing 101, a bobbin 102, a fix core 103, a moving core 104, a coil 105, a spring 106, an air vent nozzle 107, a sealing poppet 108, a sealing gasket 109 and a coil stopper 110. Here it is seen that the solenoid have a coil stopper at the end which made it prominently exposed to damages in case of any leakage.

Figure 2:
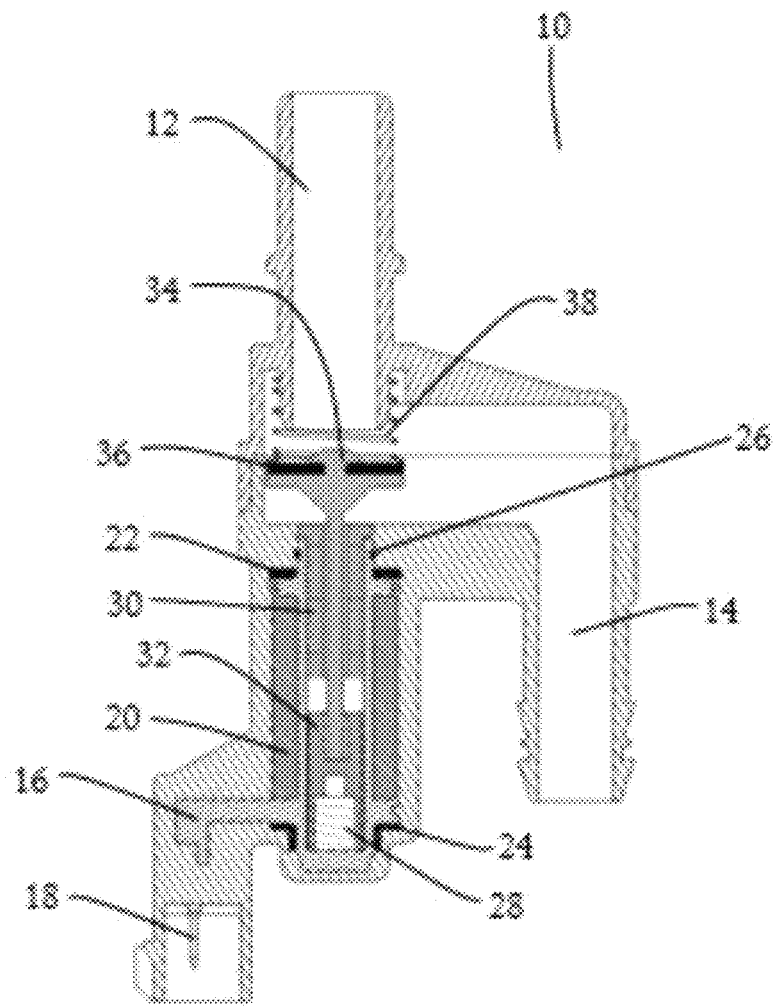
FIG. 2 shows the sectional view of a solenoid valve in accordance with an embodiment of the present invention.

FIG. 2 shows a sectional view of a solenoid valve 10 comprising, a nozzle 12 for connecting inlet hose, a housing 14 having an outlet nozzle, a bobbin 16 formed from an electrically insulated material with a bore extending axially and closed at the bottom to which a coil 20 of copper material is wound. At the opening face of bobbin 16 a fix core plate 22 is attached and coil 20 with bobbin 16 will be put inside a magnetic bracket 24 which is crimped to fix core plate 22. Further, at the one end, terminal pins 18 are connected within bobbin 16 to which coil's 20 end are connected for receiving electrical input. Further, o-ring 26 is provided at open end of bobbin 16 to avoid any leakage into coil 20 area. To damp the noise of valve while operating a noise damper spring 28 is provided at the end of moving core 32 in which poppet 34 shaft is inserted. A fixed core 30 having a guide hole for poppet 34 is fixed at the open end of bobbin 16. A sealing rubber 36 is snap fitted at the top of poppet 34, which blocks the airway under energized condition and a spring 38 is provided over sealing rubber 36, which resets poppet on de-energization.

Figure 3:
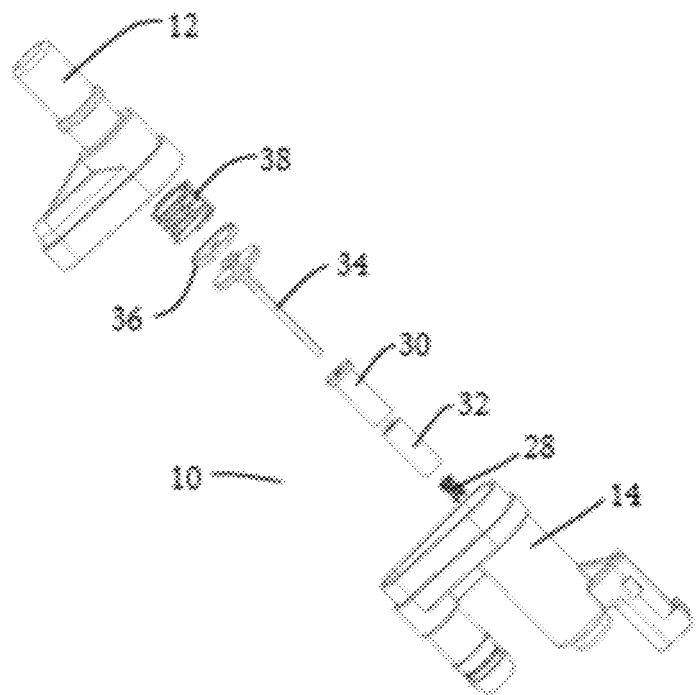
FIG. 3 shows the exploded view of a solenoid valve in accordance with an embodiment of the present invention.

FIG. 3 shows an exploded view of a solenoid valve 10 highlighting, a nozzle 12 for connecting inlet hose, a housing 14 having an outlet nozzle. To damp the noise of valve while operating a noise damper spring 28 is provided at the end of moving core 32 in which poppet 34 shaft is inserted to allow floating of poppet. A fixed core 30 having a guide hole for poppet 34 is fixed at the open end of bobbin 16. A sealing rubber 36 is snap fitted at the top of poppet 34, which blocks the air way under energized condition and a spring 38 is provided over sealing rubber 36, which resets poppet on de-energization.

Figure 4:
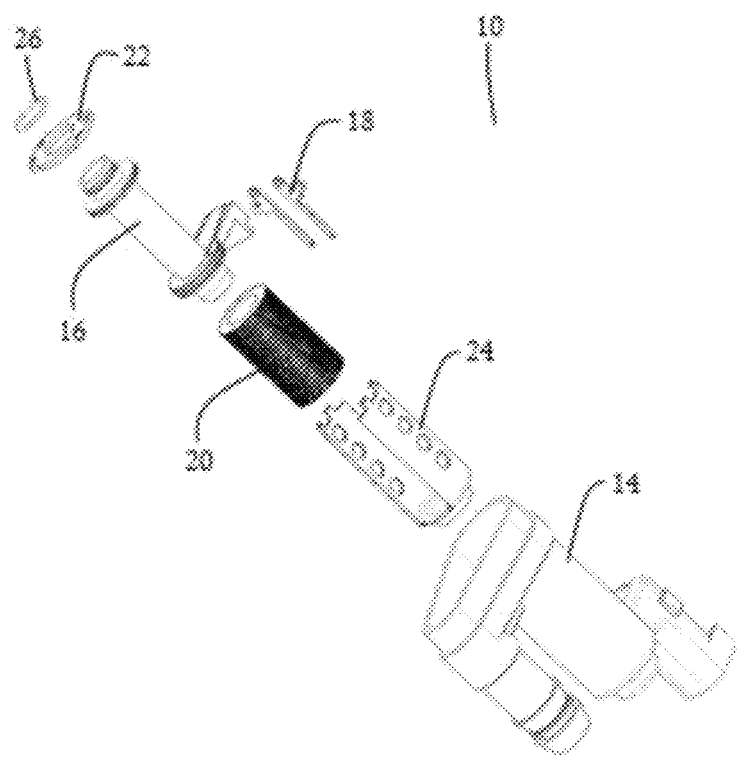
FIG. 4 shows the exploded view of a housing sub-assembly in accordance with an embodiment of the present invention.

FIG. 4 shows an exploded view of a solenoid valve 10 highlighting housing sub-assembly comprises, a housing 14 having an outlet nozzle, a bobbin 16 formed from an electrically insulated material with a bore extending axially and closed at the bottom, to which a coil 20 of copper material is wounded. At the opening face of bobbin 16 a fix core plate 22 is attached and coil 20 with bobbin 16 will be put inside a magnetic bracket 24 which is crimped to fix core plate 22. Further, at the one end, terminal pins 18 are connected with in bobbin 16 to which coil's 20 end are connected for receiving electrical input. Further, o-ring 26 is provided at open end of bobbin 16 to avoid any leakage into coil 20 area, metallic fix core 22 plate and U-bracket area of magnetic bracket 24.

Figure 5:
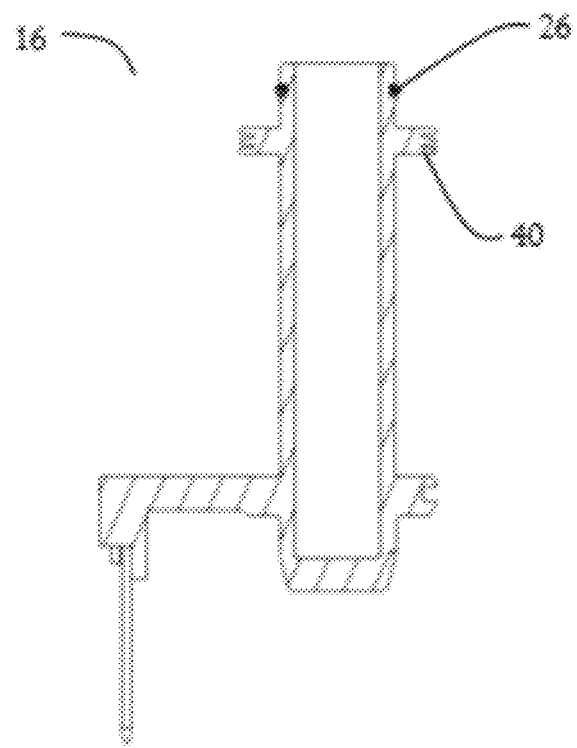
FIG. 5 shows the sectional view of a bobbin in accordance with an embodiment of the present invention.

FIG. 5 shows a sectional view of a bobbin 16 of solenoid valve 10. It is shown here that an o-ring 26 is placed at the opening top of the bobbin 16 to prevent leakage/emission of volatile components to coil which serve as additional leak proofing. Further, micro-melting fins 40 are provided with in the bobbin 16, so that during housing over molding strong bond between two materials can be formed. This enables no chance of gasoline/water trickle to the coil from outside of solenoid valve.

Figure 6:
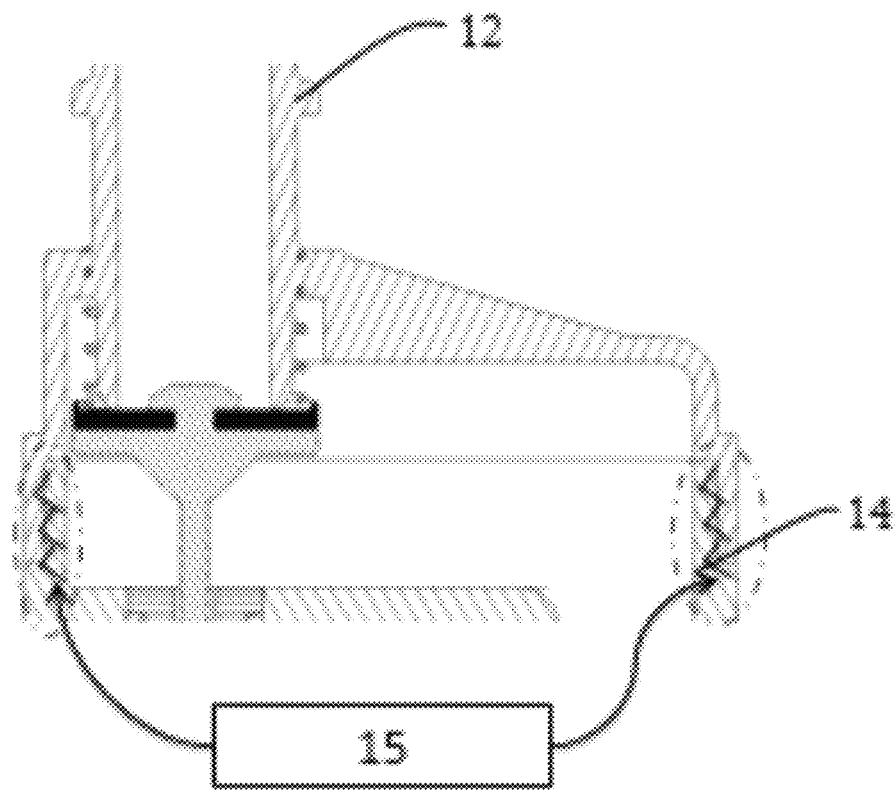
FIG. 6 shows the sectional view highlighting implementation of laser welding in accordance with an embodiment of the present invention.

FIG. 6 shows a sectional view highlighting implementation of laser welding 15 between nozzle 12 and housing 14 for complete leak proofing of solenoid valve 10.

Figure 7A:
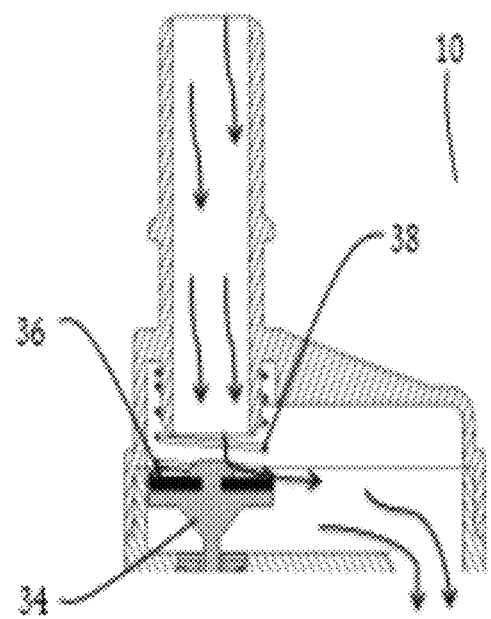
FIGS. 7a and 7b shows the operating modes of a solenoid valve in accordance with an embodiment of the present invention.
Figure 7B:
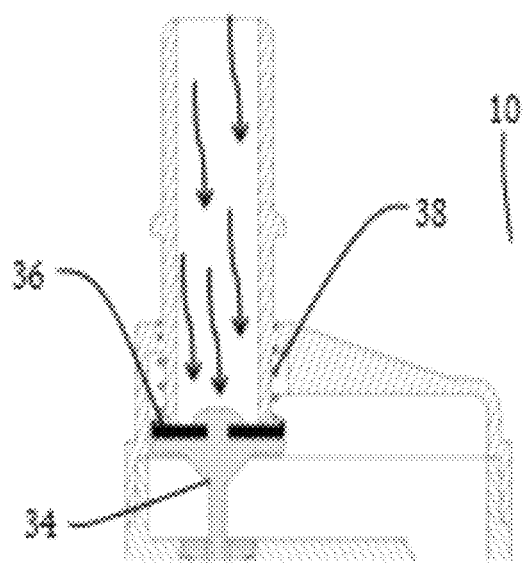

FIGS. 7a and 7b show the operating modes of a solenoid valve 10. FIG. 7a shows the valve in open condition, in this case coil is de-energized which allow poppet 34 and sealing rubber 36 to be away from the opening of nozzle 12 and let fluid entry into the valve. FIG. 7b shows the valve in closed condition, in this case coil is energized which allow poppet 34 and sealing rubber 36 to close the opening of nozzle 12 and restrict the fluid entry into the valve.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

We claim:

1. A leak proof, completely sealed solenoid valve, comprising:
   a housing 14 having a fluid flow path controlled via an electrically operated assembly to control a flow;
   the electrically operated assembly comprises metallic coil 20 coiled around a bobbin 16 supported by a magnetic bracket 24 with terminal pins 18 connected to the bobbin 16 for receiving electrical input to facilitate an energized and de-energized state to control the movement of a poppet 34 shaft that obstructs the flow; wherein,
   the bobbin 16 comprises micro-melting fins for creating strong bond while over molding the housing 14;
   a permanent joint is created between the bobbin 16 and the housing 14 to prevent internal leakage between the coil; and
   the completely sealed solenoid valve limits emissions and evaporations of the volatile fuel components into and from the valve, and contribute to reliability and robustness of the product by completely sealing the nozzle and housing using laser welding.

2. The solenoid valve according to claim 1, wherein coil with bobbin put inside a magnetic bracket is crimped to fix core plate to form a coil assembly.

3. The solenoid valve according to claim 1, wherein a housing sub-assembly is formed by over molding coil assembly inside housing body.

4. The solenoid valve according to claim 1, wherein the nozzle and housing are sealed using laser welding.

5. The solenoid valve according to claim 1, wherein the solenoid valve limits emissions and evaporations of the volatile fuel components into and from the valve, and contributes to reliability and robustness of the product by completely sealing the bobbin and housing during over molding process.

6. The solenoid valve according to claim 1, limit emissions and evaporations of the volatile fuel components into and from the valve, and contribute to reliability and robustness of the product by completely sealing the coil assembly and housing during over molding process.

7. The solenoid valve according to claim 1, limit emissions and evaporations of the volatile fuel components into and from the valve, and contribute to reliability and robustness of the product by completely sealing the nozzle and housing using laser welding.

* * * * *